United States Patent [19]

Smith

[11] Patent Number: 5,114,010

[45] Date of Patent: May 19, 1992

[54] PROTECTOR FOR STACKED SHEET MATERIAL

[75] Inventor: Jason R. Smith, Veneta, Oreg.

[73] Assignee: Industrial Finishes & Systems, Inc., Eugene, Oreg.

[21] Appl. No.: 706,029

[22] Filed: May 28, 1991

Related U.S. Application Data

[63] Continuation of Ser. No. 646,178, Jan. 28, 1991, abandoned.

[51] Int. Cl.⁵ .......................... B65D 85/48; B65D 6/36
[52] U.S. Cl. .................... 206/453; 206/586; 206/597; 217/69; 410/99
[58] Field of Search .......... 206/453, 586, 597; 217/69; 410/99

[56] References Cited

U.S. PATENT DOCUMENTS

| | | | |
|---|---|---|---|
| 3,104,085 | 9/1963 | Skladany | 206/597 X |
| 3,443,684 | 5/1969 | Taylor | 206/586 X |
| 4,120,441 | 10/1978 | Hurley | 206/453 X |
| 4,202,449 | 5/1980 | Bendt | 206/597 X |
| 4,292,901 | 10/1981 | Cox | 206/597 X |
| 4,413,735 | 11/1983 | Little | 206/586 X |
| 4,742,916 | 5/1988 | Galea | 206/586 |

Primary Examiner—William I. Price
Attorney, Agent, or Firm—James D. Givnan, Jr.

[57] ABSTRACT

A strip for placement across a sheet of a stack of banded sheet material and having end segments positionable against the sides of the stack. Flexible webs join the strip segments to the major part of the strip and permit bending of the end segments into place against the stack. Wall surfaces of the strip define an open area into which a clamp and clamped segments of a band may be displaced without damaging contact with the surface of the adjacent sheet of material.

7 Claims, 1 Drawing Sheet

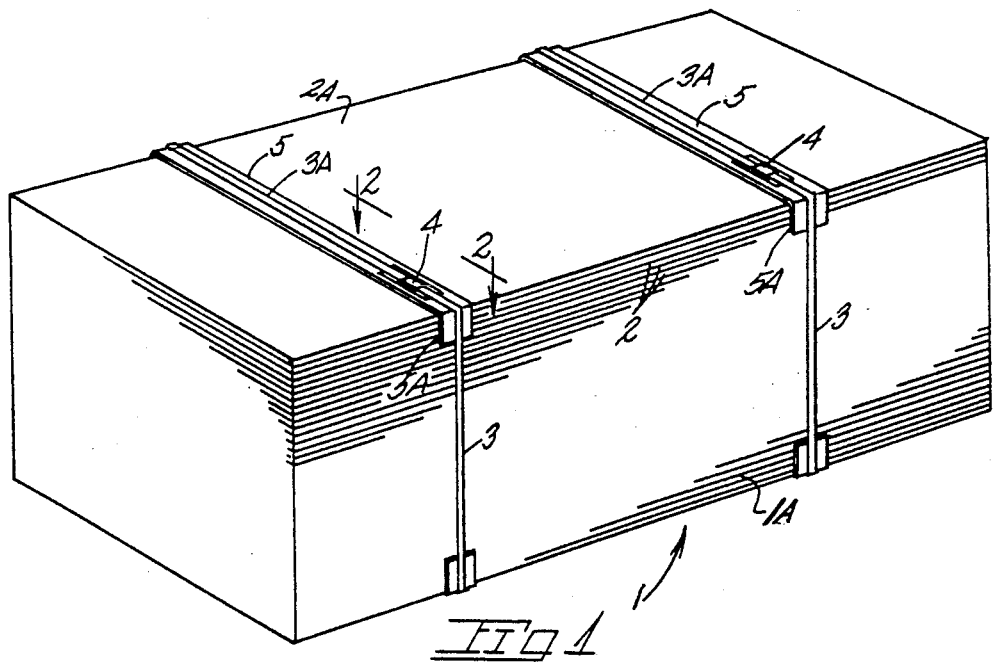
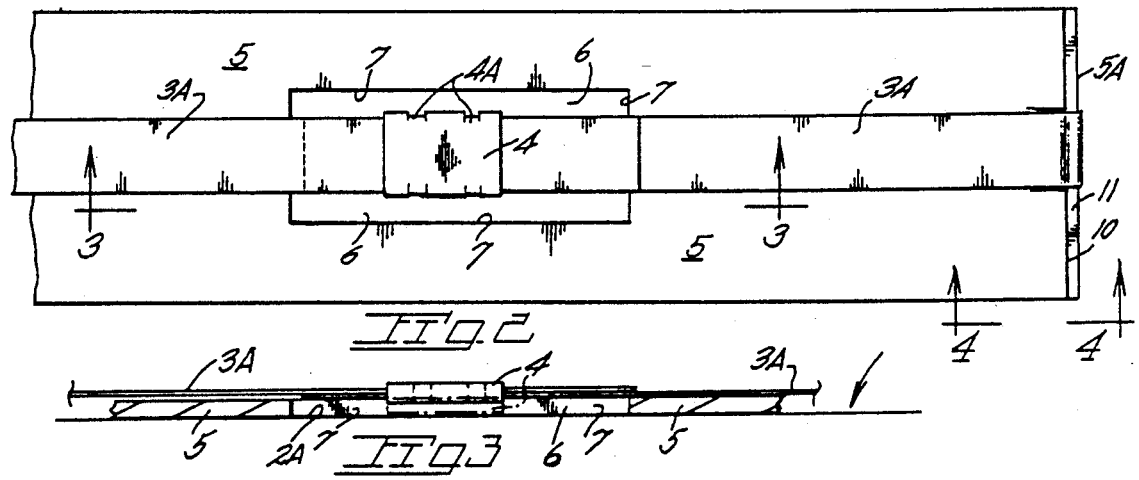
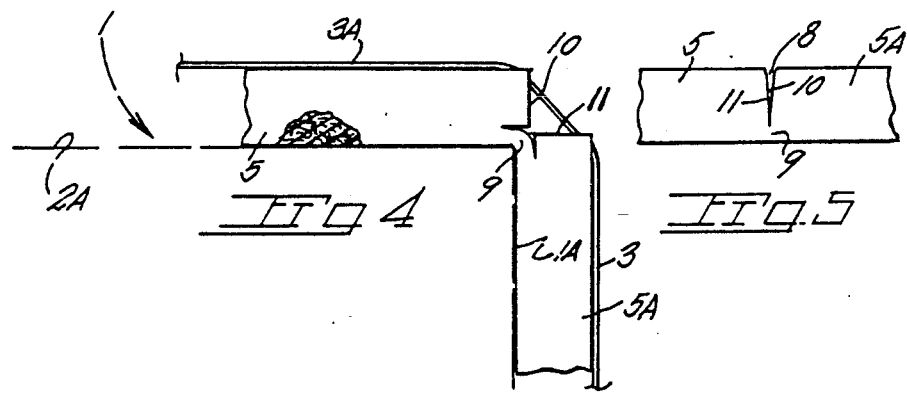

PROTECTOR FOR STACKED SHEET MATERIAL

This is a continuation of application Ser. No. 07/646,178 filed Jan. 28, 1991 and now abandoned.

BACKGROUND OF THE INVENTION

The present invention concerns generally a protective device for placement between a strap or band and the uppermost sheet of a stack of sheet material to protect the sheet from being marred by the strap or a clamp joining the ends of the strap.

In the wood products industry it is standard practice to secure stacks of sheet material such as plywood for example by a tensioned strap. Previously used are right angular protectors in place on the stack corners to isolate the top and bottom sheets of material from contact with a strap or tensioned band extending thereabout. The problem arises when stacks are placed on one another to cause the span segment of the strap extending across the stack to be displaced downwardly into contact with the uppermost sheet of the stack. The problem is further complicated by the use of a clamp extending about the end segments of the band which adds to the thickness of the band and further jeopardizes the finish or surface of the uppermost sheet.

Various types of edge protectors have been proposed for use on stack sheet material including molded articles such as those disclosed in U.S. Pat. Nos. 4,120,441, and 4,742,916 and 4,202,449 which discloses a protector of extruded shape. U.S. Pat. Nos. 3,443,684 and 4,292,901 disclose protectors for placement on the corners of stacked material to isolate a tension band or cord from contact therewith.

It has been found that sheet material is carefully inspected by most purchasers and sheets having any surface irregularity are rejected resulting in a reimbursement to the customer and an expense to the seller.

Another problem encountered with protective devices used on stacked sheet material is that any contact between a strap and the surface of the sheet material can cause a surface irregularity to depreciate sheet value. Accordingly, it is preferable to isolate the horizontal spans of the band extending about the stack from contact with the material.

SUMMARY OF THE PRESENT INVENTION

The present invention is embodied in a protective strip for stacked material having displaceable end segments.

The strip open area receives a clamp securing the ends of the band to one another so as to space or elevate the clamp from an adjacent sheet surface. End segments of the protective strip are cut partially to leave a flexible web which permits the end segment to be swung into perpendicular relationship with the main portion of the strip. The present strips may be formed from inexpensive fibrous material such as cardboard to permit economical, one way use of the strips and low cost disposal of the strips.

Important objectives of the present protective strip include the provision of the strip having an open area therein in which may be received a clamping element joining the ends of the band extending about a stack of sheet material; the provision of a protective strip having die cuts extending thereacross to partially sever the strip to leave a flexible web of material joining end segments with the strip with a material permitting hinged displacement of the end segments into place against the sides of the stack; the provision of a protective strip which isolates a horizontal span of the band from the outer surfaces of an uppermost and a lowermost sheet of stacked material.

BRIEF DESCRIPTION OF THE DRAWINGS

In the accompanying drawings:

FIG. 1 is a perspective view of a stack of sheet material with bands thereabout and the present protector in place;

FIG. 2 is a fragmentary view taken downwardly along line 2—2 of FIG. 1;

FIG. 3 is a vertical sectional view taken along 3—3 of FIG. 2;

FIG. 4 is a fragmentary elevational view taken along line 4—4 of FIG. 2; and

FIG. 5 is a view similar to FIG. 4 but showing a strip end segment prior to bending.

DETAILED DESCRIPTION OF PREFERRED EMBODIMENTS

With continuing attention to the drawings wherein applied reference numerals indicate parts similarly hereinafter identified. The reference numeral 1 indicates generally a stack of sheet material 2 secured in a stack by bands at 3.

Extending horizontally across the stack are spans or segments 3A or bands 3 with the ends of the bands joined by clamps at 4. Clamps 4 may be of the well known type having deformed portions at 4A (FIG. 2) for the purpose of securing the band end portions into engagement with one another in a non-slip manner.

The present invention is embodied within a protector indicated at 5 which is of strip or elongate configuration for overlying the width of the uppermost sheet 2 of the sheet material. Displaceable end segments at 5A of strip 5 are positionable through 90 degrees into abutment with the sides 1A of stack 1. Preferably an open area 6 of strip 5 is defined as by an interior wall 7 of the strip which preferably extends entirely through the strip. Open area 6 is disposed off center in strip 5 so as to be positioned to receive clamp 4 adjacent an end of the strip. As shown in FIG. 3 strip thickness is of a dimension to provide an open area 6 within which clamp 4 may be displaced without contacting the upper surface 2 of the sheet. Strips having a thickness of approximately one quarter inch have proved to be of sufficient thickness. Accordingly sheet surface 2A is protected from being marred by clamp 4 and band 3 even when stacks 1 are superimposed on one another with the clamp being displaced downwardly by a band extending about a superimposed stack (not shown). Further, the open area 6 facilitates the application of a clamp 4 to the band using conventional tools.

With attention to FIGS. 4 and 5, end segments 5A of strip 5 may be formed by transverse die cutting of strip 5 to provide a cut 8 extending through the strip so as to leave a web 9 intact. Opposed strip walls 10 and 11 are thereby formed respectively on the primary portion of strip 5 and the end segments 5A. A suitable material for strip 5 is cardboard of fibrous construction which results in web 9 being flexible to permit positioning of end segments 5A into perpendicular relationship with the main portion of strip 5.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A protector for use on a stack of sheet material to protect the exposed surfaces of the sheet material from a band extending about the stack and fastened by a clamp, said protector comprising, a strip of a length exceeding the width of the stack, cuts in said strip extending partially through the strip and forming end segments on said strip, and webs integral with said end segments resulting from said cuts, said webs being of a flexible nature to permit positioning of the end segments perpendicular to the remaining portion of the strip for abutment with the sides of the stack, said strip defining an open area into which a clamp on the band may be displaced without contact with the sheet material.

2. The protector claimed in claim 1 wherein said strip is of a thickness greater than the depth of the clamp in place on the band.

3. The protector claimed in claim 1 wherein said strip is of a fibrous nature.

4. The protector claimed in claim 1 wherein said strip is of cardboard.

5. A protector for use on a stack of sheet material to protect the exposed surfaces of the sheet material from a band extending about the stack, said protector comprising, a strip of fibrous material, said strip having a cut therein extending across and partially through the strip and forming an end segment on said strip, and a web integral with said end segment resulting from said cut, said web being of a flexible nature to permit positioning of the end segment perpendicular to the remaining portion of the strip for abutment with a side of the stack.

6. The protector claimed in claim 5 wherein said strip is of a length to exceed the width of the stack, an additional cut in said strip extending across and partially through said strip and forming an additional end segment on said strip, an additional web integral with said additional end segment resulting from said additional cut, said additional web also being of a flexible nature.

7. The protector claimed in claim 5 wherein said strip is of cardboard.

* * * * *